March 11, 1958 D. E. LINDSAY 2,826,678
LIGHTING FIXTURE EQUIPMENT
Filed Jan. 30, 1953 3 Sheets-Sheet 1
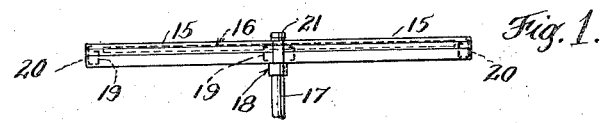
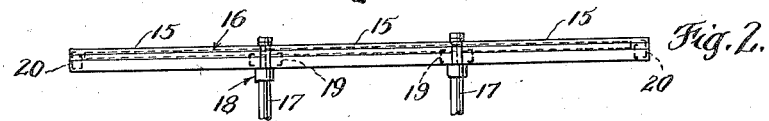
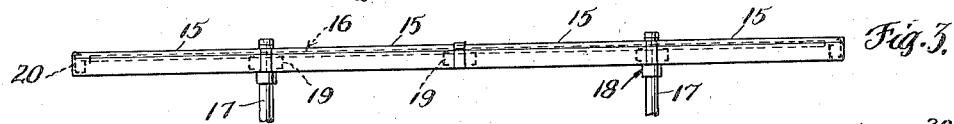
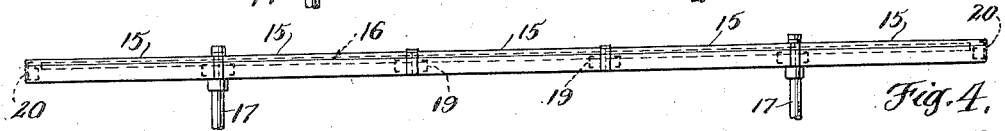
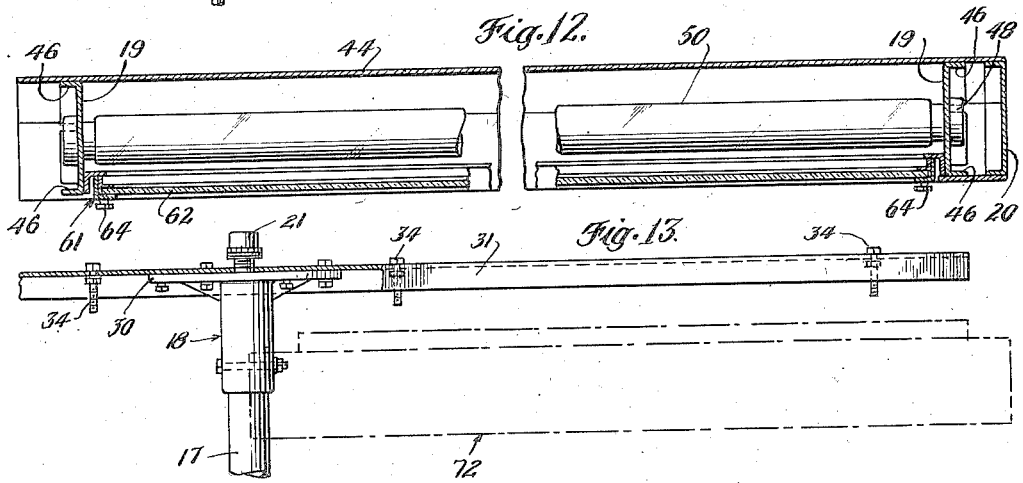
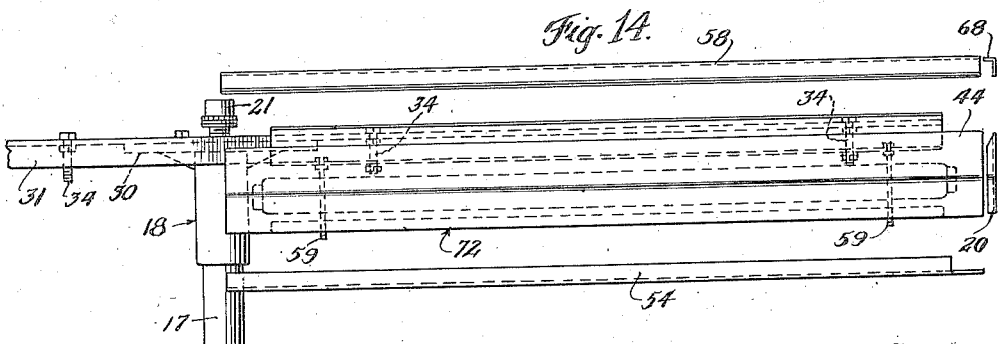
Inventor
Donald E. Lindsay
By
Synnestvedt and Lechner
Attorneys March 11, 1958 — D. E. LINDSAY — 2,826,678
LIGHTING FIXTURE EQUIPMENT
Filed Jan. 30, 1953 — 3 Sheets-Sheet 2

Inventor
Donald C. Lindsay
By
Synnestvedt and Lechner
Attorneys

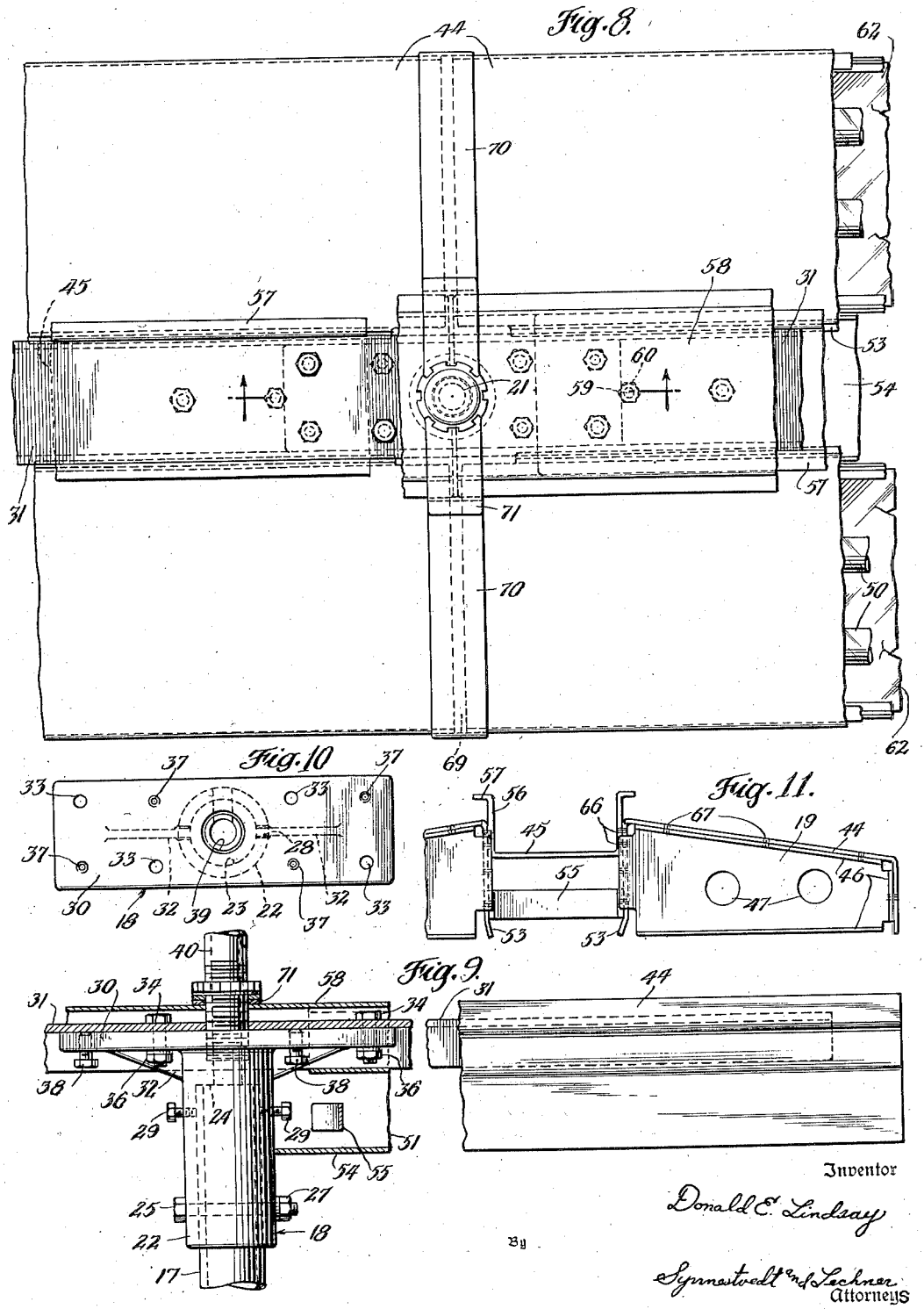

United States Patent Office
2,826,678
Patented Mar. 11, 1958

2,826,678

LIGHTING FIXTURE EQUIPMENT

Donald E. Lindsay, Bala-Cynwyd, Pa., assignor to Murlin Manufacturing Company, Philadelphia, Pa., a corporation of Pennsylvania Application January 30, 1953, Serial No. 334,215

9 Claims. (Cl. 240—3)

This invention relates to lighting fixture equipment, and is particularly concerned with a novel structure for supporting in end-to-end relation a series of elongated electric lamps mounted in lighting fixture units. The lighting fixture equipment of the invention is particularly suited for outdoor use.

Very generally, the equipment includes one or more post fittings each associated with the top of a post, a channel member or beam supported thereby and a plurality of like lighting fixture units attached to and supported by the channel member.

It is an important object of the invention to provide lighting fixture equipment which is exceedingly rugged and yet is capable of the simplest manufacture and is susceptible of extremely easy assembly.

A second important object of the invention is to provide a lighting fixture unit which is readily adaptable to alternative use in a variety of multiples, supported by one or more posts. Thus the lighting needs of any particular location can be filled by supplying a variable number of fixture units which may be supported by a variable number of posts.

Another object of the invention is to provide overhead lighting fixture units which may readily be assembled to the supporting means from below.

Yet another object of the invention is the provision of simplified apparatus, readily attachable to and removable from the lighting fixture, for the support of incidental equipment such as flood lights.

A further object of the invention is the provision of a lighting fixture unit which is adapted for easy electrical connection either with other lighting units and/or with a power source.

Yet another object of the invention is the provision of a lighting fixture unit the basic parts of which are readily manufactured and welded into a unitary structure.

How these objects and others within the scope of the invention are attained will be more clearly understood upon reference to the detailed description which follows hereinbelow and upon reference to the drawings in which:

Figure 1 is a partially outline side elevational view showing lighting fixture equipment constructed according to the present invention, including two lighting fixture units both carried by one supporting post;

Figure 2 is a view similar to Figure 1 of a lighting fixture installation made up of three lighting fixture units and further showing the assembly in association with two supporting posts;

Figure 3 is a view similar to Figure 1 of a lighting fixture installation made up of four lighting fixture units and further showing the lighting fixture in association with two supporting posts;

Figure 4 is a view similar to Figure 1 of a lighting fixture installation made up of five lighting fixture units and further showing the lighting fixture in association with two supporting posts;

Figure 8 is a fragmentary plan view with certain parts broken away of a lighting fixture constructed according to the invention;

Figure 9 is a fragmentary longitudinal section taken at a post fitting and further illustrating a support for flood lights or the like in association with the lighting fixture;

Figure 10 is a plan view of the post fitting;

Figure 11 is a fragmentary end view of those parts of the lighting fixture unit which are welded together to form a unitary structure;

Figure 12 is a broken out longitudinal section through a lighting fixture unit, this view showing an end cover plate in position;

Figure 5:
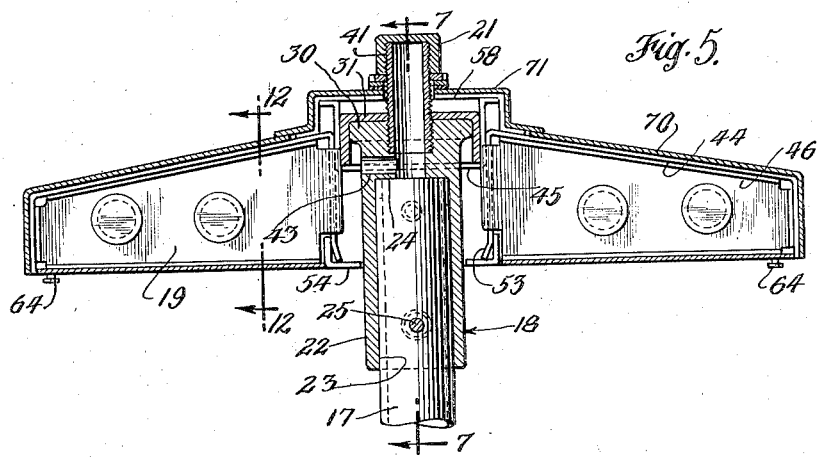
Figure 5 is a transverse sectional view taken on an enlarged scale as compared with Figures 1 to 4 along the line 5—5 in Figure 7.

Figure 13 illustrates certain steps of assembly of a lighting fixture constructed according to the invention, this view showing the post, post fitting and channel assembled (in full lines) and also showing (in dot and dash lines) an assembled lighting fixture unit in the act of being attached to the channel from below; and Figure 14 illustrates certain other steps of assembly, this view showing an assembled lighting fixture unit attached to the channel and showing the top, bottom and end cover plates in position ready to be put into place.

With reference to Figures 1 to 4, it is understood that these figures illustrate a few of the many possible combinations of lighting fixture units which can readily be assembled to suit the particular location of the lighting fixture. It may here be mentioned that the equipment of the present invention is particularly useful where an elongated source of light is required; a specific example being a gasoline-pump island of an automobile service station, since it is common for such installations to be associated with an elongated overhead light source running either parallel to or transverse to the island.

Shown essentially in outline in Figures 1 to 4 are lighting fixture units 15 attached to channel members 16. Posts 17 carry post fittings 18 which in turn support the channels 16. Transverse lamp supports 19 are shown in both ends of each lighting fixture unit 15 and end cover plates 20 are shown in the free ends of the terminal units of each assembly. Post caps 21 are shown in association with the lighting fixture at the location of each post 17.

As best seen in Figures 5, 7, 9 and 10, the post fitting 18 comprises a lower hollow cylinder or sleeve-like portion 22 the bore 23 of which is slightly larger than the diameter of the post 17 to enable the post fitting to slide down over the top portion of the post. The bore 23 is shouldered as at 24 to provide a seat for the top end of the post 17.

The post fitting 18 is adapted to be secured to the post 17 by a bolt 25 and nut 27. It is here noted that the post fitting 18 is provided with a bolt hole 28 (see Fig. 10) and that after the post fitting is slipped over the top of a post, a hole for the bolt 25 is drilled in the post 17 when the post fitting is in the proper relationship with the post. Thus bolt 25 serves not only to hold the post fitting onto the post but also to keep the post fitting from rotating out of proper position. Machine screws 29 may be provided in order to lessen the possibility of rattling due to vibrations. The post fitting 18 has a flanged portion 30 extending substantially horizontally from the upper end of the post fitting and adapted to cooperate with and carry the channel member or beam 31. Webs 32 serve to strengthen and rigidify the post fitting. Bolt holes 33 are provided in the flange portion 30 of the post fitting for the insertion of bolts 34 which, together with nuts 36 serve to hold the channel member to the post fitting. As seen in Figures 9 and 10, threaded holes 37 are provided to cooperate with vertically adjustable seating elements, such as machine screws 38, to provide fine adjustment of the contact between the channel member 31 and the flange portion 30 of the post fitting. These figures also show tapped hole 39 which permits easy insertion and removal of an auxiliary supporting member such as pipe 40, which may be utilized to support such accessories as flood lights. When it is not desired, such pipe 40 may be removed and in its place stud 41 (see Figs. 5 and 7) topped by cap 21 may be used to prevent water from entering the passage 39.

The channel 31 runs substantially the whole length of a completed light fixture assembly. This channel is U shaped in section, preferably of metal. It is here noted that the flange portion 30 of the post fitting fits neatly into the channel portion of the channel member 31 and that this fit accomplishes the dual function of correctly positioning the post fittings and holding the channel member while the fastening bolts 34 are put in place. In addition, if the flange portion 30 fits nicely into the channel portion, there results automatic lateral positioning of the channel member 31.

Since electric wiring is needed for the lamps, it may be convenient to supply a hole 43 (see Fig. 5) leading into the bore of the post fitting 18 in order to permit the wiring to be enclosed in the post.

Thus it is seen that the preliminary steps in installing a lighting fixture constructed according to the present invention are as follows: First, one or more vertical posts are erected which may conveniently be hollow metal pipe. Next, a post fitting is slid over the top of each of the posts and lightly held in position by tightening the machine screws 29. A channel member, pre-cut to substantially the length of the required lighting fixture, is lowered in place onto the flange portions of the post fittings, which automatically positions both the channel member and the post fittings. Finally, appropriate holes are drilled in the channel and in the post to accommodate bolts 34 and 25, and, after adjustment by the vertically adjustable seat elements 38 the nuts are assembled on the bolts and tightened.

Turning to the construction of a lighting fixture unit, attention is called particularly to Figures 5, 6, 7, 8, 11 and 12. It is there seen that the fixture section or unit is made up of a number of readily manufactured parts as described hereinbelow. There is a hood 44 which serves to house the electric lamps proper extending laterally at both sides from the central support receiving socket or trough 45. Transverse lamp supports 19 are provided in each end of the hood 44. These supports 19 have turned flanges 46 (see Fig. 11) to facilitate connection with the hood, and are apertured as at 47 to permit the insertion of electric lamp holders 48, which holders are commonly provided with prong sockets 49 for supporting and making electrical contact with the prongs of elongated electric lamps 50.

The supports 19 are secured to the hood 44 in a position slightly inboard from the extreme end of the hood. This position is selected because there is thereby left a recess at the end of the hood into which a portion of the electric lamp holders 48 may protrude without sticking out beyond the extreme end of the hood in a manner to interfere with the end-to-end positioning of the lighting fixture units. In addition this recess at the end conveniently houses electrical wiring running between a wiring conduit described hereinbelow and the prongs 49. This end recess is made large enough in all units to permit the insertion of an end cover plate 20 should that particular unit be used as the end unit of an assembled lighting fixture.

Figure 6:
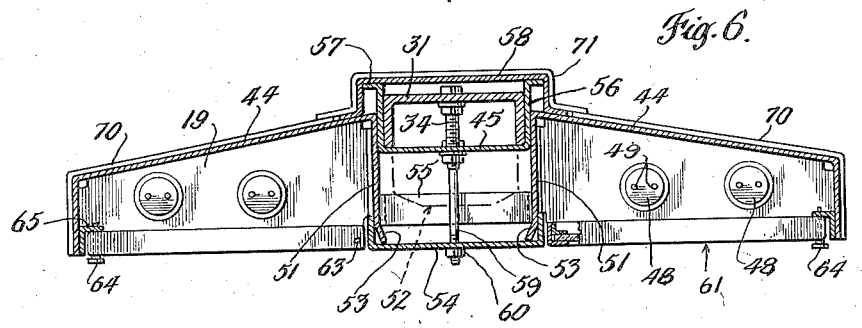
Figure 6 is a transverse sectional view taken along the line 6—6 in Figure 7.

As best seen in Figure 6, the hood is constructed so as to have an interior channel or conduit formed between downturned edges 51 of the hood structure 44. This channel houses the necessary electrical wiring and other electrical implements such as transformers indicated in general in dot and dash lines at 52. The lower portion of the sides of this channel or conduit are crimped inwardly as at 53 to facilitate the positioning of the bottom cover plate 54.

Reinforcing straps 55 may be welded to the inside of the wiring channel at either end of the hood.

The support receiving socket or trough 45 has upwardly extending sides 56 provided with flanges 57 to facilitate the attachment of the top cover plate 58. This top cover plate 58 is retained on the hood by means of snap action with the flanges 57. The bottom cover plate 54 for closing the lower side of the wiring conduit is held onto the hood by means of bolts and nuts as at 59, 60.

Figure 7:
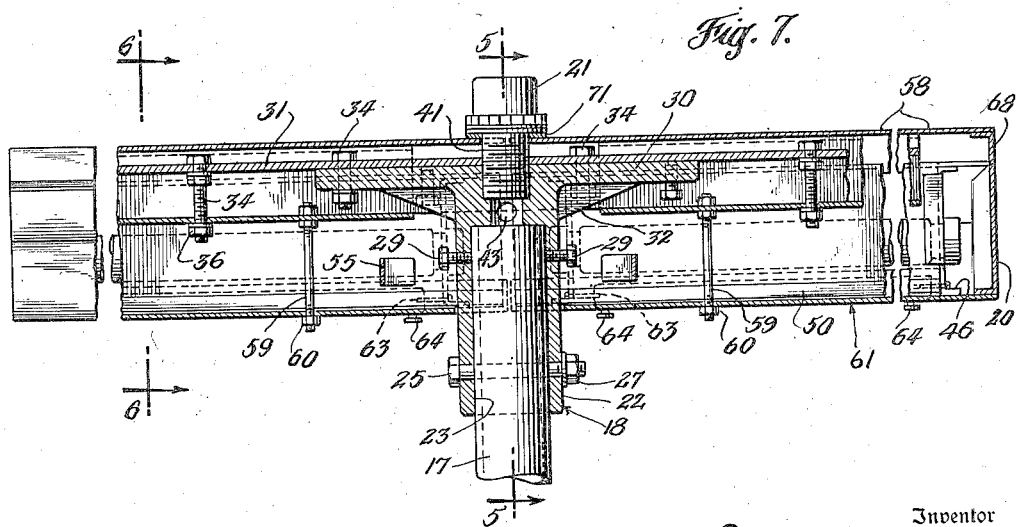
Figure 7 is a broken out longitudinal section taken along the line 7—7 of Figure 5.

As best seen in Figures 6, 7 and 12, doors 61 for closing the lamp housings are provided having panels 62 made of transparent material such as glass. These doors are mounted for hinged action on pins 63 located on the inboard side of the door. Thus the doors may be readily swung toward the posts and thus out of the way when it is necessary to make repairs or replace burned out electric lamps. These doors are held in closed position by thumb screws 64 cooperating with tabs 65 which tabs are welded onto the inside of the hood.

As seen in Figure 11, the support receiving socket or trough 45 may be secured to the hood by means of spot welds such as are indicated at 66 and the flanges 46 of the transverse lamp supports 19 may be attached to the hood by means of spot welds such as are indicated at 67.

Attention is called to the fact that the basic parts of the lighting fixture unit, that is, the hood 44, the support receiving socket or trough 45, the straps 55 and the transverse lamp supports 19 are conveniently manufactured as a unit. This unitary construction is advantageous from the standpoint of strength, durability and ease of assembly with other parts.

As seen in Figures 7 and 14, a small additional end cover plate 68 is provided for closing off the open end of the top cover plate 58.

When two lighting units are assembled in end-to-end relation, the space 69 may be left between their ends (see Fig. 8). This space makes for easy and quick assembly since no fine adjustment of the position of the lighting fixture units is necessary. Joint cover strips 70 and 71 are provided to cover this space between the hoods of the two assembled lighting units and between the top cover plates of the two assembled units respectively.

Turning now to the assembly drawing of Figure 13, it is seen that an assembled lighting fixture unit 72 may be raised up from below into cooperation with an assembled channel, post fitting and post. It is obvious that when assembling lighting fixtures on a location (such as an automobile service station) it is a great convenience to be able to assemble the fixture from below. This arrangement reduces the time required for assembly as well as reducing the possibility of accidents due to falling parts during the assembly. When the assembled lighting fixture unit 72 has been raised until the channel 31 fits down into the support receiving socket 45, nuts 36 may be assembled onto fastening bolts 34 to hold the unit 72 in place (as described above).

Figure 14 illustrates the assembly steps just following those discussed in connection with Figure 13, that is, the addition of the top, bottom and end cover plates. In Figure 14, the top cover plate 58 is shown above the lighting unit 72 and ready to be lowered into place. The end cover plate 68 is shown to the right in position to be inserted into the end of the top cover plate 58. The end cover plate 20 is shown to the right in position ready to be inserted into the end of the hood 44 of light fixture unit 72. Bottom cover plate 54 is shown in position below the unit 72 ready to be raised into position onto bolts 59 which hold bottom cover plate 54 in place. From the foregoing, it is seen that all of the assembly steps which require close observation of the assembler (such steps as screwing nuts onto bolts) are done from below. While the top cover plate 58 must be assembled from above, it is noted that this piece is held on by snap action and, therefore, it too is easily positioned by an assembler standing below the light fixture.

From the foregoing full description of the structural features of the equipment of this invention, numerous advantageous characteristics will occur to to those skilled in the art. In conclusion it is desired to emphasize several of the important advantages including the following.

The lighting fixture equipment described constitutes, in effect, a lighting fixture system of unusual flexibility from the standpoint of the degree of extension of the assembled parts to provide lighting over either a relatively short strip or a relatively long strip, this being accomplished by the employment of standardized or duplicate units which may be assembled in end-to-end relation in a variety of multiples. Moreover the system of the invention has unusual flexibility from the standpoint of the number of supporting posts on which the assembly may be mounted. Thus, as shown in Figures 2, 3 and 4, installations may readily be made incorporating either three, four or five individual units and in each case only two supporting posts are required. Alternatively, it is contemplated that in assemblies of the kind shown in Figures 3 and 4 additional posts may be used if desired or needed.

Flexibility in the senses mentioned above and also in other senses is achieved, at least in part as a result of the employment of a common supporting beam extended substantially throughout the combined length of whatever number of individual fixture units are employed. As will readily be appreciated, this common supporting beam may be mounted upon supporting posts located in any desired pattern along the length of the assembly, provided only that the posts are arranged at the junction points between adjacent fixture units.

The provision of the upwardly open support receiving trough in each unit is also an important characteristic of the equipment of the invention since it provides not only for convenient and accurate positioning of the several units in end-to-end relation upon a common supporting beam, but also provides for maximum convenience in mounting and assembling of the units.

I claim:

1. In sectionalized lighting fixture equipment of the kind incorporating elongated fixture section units adapted for multiple end-to-end mounting on one or more supporting posts extending upwardly from a fixed base, a post fitting at the upper end of a post having a flange portion extending substantially horizontally, a beam carried by said flange portion, and a fixture unit comprising an elongated hood having an upwardly open trough adapted to receive said beam, said hood extending laterally outwardly from said beam and being supported thereby, said hood having three elongated parallel housings open downwardly, the first of said housings lying under said upwardly open trough and adapted to receive wiring for the fixture, and the second and third lying on either side of said first housing and adapted to receive electric light emitting means.

2. A construction according to claim 1 and further including an upwardly removable top cover plate for the beam receiving trough.

3. A construction according to claim 1 comprising a plurality of post fittings at the upper ends of a plurality of posts carrying said beam at a plurality of points spaced lengthwise of the beam, and further including a plurality of fixture units as defined in claim 1 arranged along the beam in end-to-end relation.

4. A construction according to claim 1 and further including vertically adjustable seating elements cooperating with the flange portion of the post fitting and with the beam.

5. In sectionalized lighting fixture equipment of the kind incorporating elongated fixture section units adapted for multiple end-to-end mounting on one or more supporting posts extending upwardly from a fixed base, a plurality of fixture units in end-to-end relation and each having an upwardly open trough extended lengthwise of the mid region thereof, a fixture supporting channel beam extended in the troughs of said units substantially throughout the combined length thereof, the side walls of the troughs and the flanges of the channel beam being interengageable to laterally position the fixture units with respect to the channel beam, securing devices for connecting the fixture units to the channel beam for vertical support therefrom, and a post fitting on a supporting post connected with said channel beam in the region of the adjacent ends of two adjacent fixture units supported by said channel beam.

6. A construction according to claim 5 and further including a top cover plate extended over the channel beam in the trough, said cover plate being attached to said fixture unit adjacent the edges of the trough.

7. In sectionalized lighting fixture equipment of the kind incorporating elongated fixture section units adapted for multiple end-to-end mounting on one or more supporting posts extending upwardly from a fixed base, a plurality of fixture units in end-to-end relation and each having an upwardly open trough extended lengthwise of the mid region thereof, a downwardly open fixture supporting channel beam extended in the troughs of said units substantially throughout the combined length thereof, securing devices for connecting the fixture units to the channel beam for vertical support therefrom, and a post fitting on a supporting post, said post fitting having an elongated flange portion interengageable with the channel beam to laterally position the channel beam with respect to the post fitting and to angularly position the flange portion of the post fitting with respect to the post, said post fitting being conneced with said channel beam in the region of the adjacent ends of two adjacent fixture units supported by said channel beam.

8. In sectionalized lighting fixture equipment of the kind incorporating elongated fixture section units adapted for multiple end-to-end mounting on one or more supporting posts extending upwardly from a fixed base, a plurality of fixture units in end-to-end relation and each having an upwardly open trough extended lengthwise thereof, a fixture supporting channel beam extended in the troughs of said units substantially throughout the combined length thereof, securing devices for connecting the fixture units to the channel beam for vertical support therefrom, each fixture unit also having a downwardly open conduit lying below said trough and extended lengthwise of the fixture unit and adapted to receive wiring for the fixture, and a post fitting on a supporting post connected with said channel beam, said post fitting on a supporting post intersecting the conduit and the proportions of the post fitting and conduit being such that lateral clearance is provided in the conduit.

9. In sectionalized lighting fixture equipment of the kind incorporating elongated fixture section units adapted for multiple end-to-end mounting on one or more supporting posts extending upwardly from a fixed base, a fixture unit including as a unitary structure an elongated hood and a support receiving member comprising an upwardly open channel extended lengthwise of the hood, a fixture supporting beam member adapted to be supported on at least one supporting post and extended in the upwardly open channels of a plurality of said units substantially throughout the combined length thereof, said fixture units being adapted to be assembled with said fixture supporting beam member upwardly from below, and securing devices for connecting the fixture units to the supporting beam member for vertical support therefrom.

References Cited in the file of this patent

UNITED STATES PATENTS

| | | |
|---|---|---|
| 1,682,693 | Day | Aug. 28, 1928 |
| 2,250,276 | Rutherford et al. | July 22, 1941 |
| 2,269,165 | Rutledge | Jan. 6, 1942 |
| 2,314,420 | Orth | Mar. 23, 1943 |
| 2,327,552 | Poehling | Aug. 24, 1943 |
| 2,328,445 | Francis | Aug. 31, 1943 |
| 2,625,646 | Goebel | Jan. 13, 1953 |
| 2,659,811 | Wakefield | Nov. 17, 1953 |

FOREIGN PATENTS

| | | |
|---|---|---|
| 563,733 | Great Britain | Aug. 28, 1944 |